United States Patent [19]

Ronarc'H et al.

[11] Patent Number: 5,473,713

[45] Date of Patent: Dec. 5, 1995

[54] OPTICAL AMPLIFIER HAVING A DOPED FLUORIDE GLASS OPTICAL FIBRE AND PROCESS FOR PRODUCING THIS AMPLIFIER

[75] Inventors: Daniel Ronarc'H; Marcel Guibert; Houmed Ibrahim, all of Lannion, France

[73] Assignee: France Telecom Etablissement Autonome de Droit Public, Paris, France

[21] Appl. No.: 279,546

[22] Filed: Jul. 25, 1994

[30] Foreign Application Priority Data

Jul. 26, 1993 [FR] France .................................. 93 09165

[51] Int. Cl.⁶ ................................................. G02B 6/28
[52] U.S. Cl. .......................... 385/28; 359/341; 385/15; 385/142
[58] Field of Search ................................ 385/12, 15, 27, 385/28, 30, 31, 39, 50, 95, 141, 142, 144; 372/6, 40; 359/341, 343

[56] References Cited

U.S. PATENT DOCUMENTS

| | | | |
|---|---|---|---|
| 4,962,995 | 10/1990 | Andrews et al. | 359/341 |
| 5,042,039 | 8/1991 | Edagawa et al. | 372/6 |
| 5,283,846 | 2/1994 | Toyonaka et al. | 385/27 |
| 5,295,217 | 3/1994 | Marceron et al. | 385/122 |
| 5,299,210 | 3/1994 | Snitzer et al. | 372/6 |
| 5,351,335 | 9/1994 | Ohishi et al. | 385/142 |

FOREIGN PATENT DOCUMENTS

| | | |
|---|---|---|
| 0521763 | 1/1993 | European Pat. Off. . |
| 2243942 | 11/1991 | United Kingdom . |
| 2244172 | 11/1991 | United Kingdom . |

OTHER PUBLICATIONS

IEEE Photonics Technology Letters, vol. 5, No. 4, Apr. 1993, New York, pp. 401–403, T. Whitley et al., "High Output Power From An Efficient Praseodymium–Doped Fluoride Fiber Amplifier".

IEEE Photonics Technology Letters, vol. 4, No. 9, Sep. 1992, New York, pp. 994–996, M. Yamada et al., "15.1–dB–gain Pr3+ Doped Fluoride Fiber Amplifier Pumped By High–Power Laser–Diode–Modules".

*Primary Examiner*—John D. Lee
*Attorney, Agent, or Firm*—Pearne, Gordon, McCoy & Granger

[57] ABSTRACT

An optical amplifier having a doped fluoride glass optical fiber and a process for producing such an amplifier. To produce the doped fluoride glass fiber amplifier which is operable to amplify a light signal (S), an optical multiplexer (4) is produced having on the one hand two silica fibres (6, 8) and on the other a fluoride glass fiber (2), whereof at least one section is doped and an optical coupling is brought about between the fluoride glass fiber and at least one other silica fibre (12, 14).

9 Claims, 1 Drawing Sheet

OPTICAL AMPLIFIER HAVING A DOPED FLUORIDE GLASS OPTICAL FIBRE AND PROCESS FOR PRODUCING THIS AMPLIFIER

BACKGROUND OF THE INVENTION

The present invention relates to an optical amplifier having a doped fluoride glass optical fibre and process for the production of said amplifier. It has applications more particularly in the field of optical fibre telecommunications.

It is known that it is possible to use optical amplifiers with a fibre doped by a rare earth for producing telecommunications systems, both in transmission and in distribution.

An optical amplifier having a silica fibre doped by erbium has been the most widely studied.

For some time now studies have revealed that other glasses than silica could give rise to good quality optical fibres and said fibres could also be doped by rare earths. Fluoride glass fibres, e.g. ZBLAN, are commercially available and it has been demonstrated that the doping of the core of such fibres by erbium (respectively praseo-dymium) made it possible to amplify a radiation having a wavelength close to 1.5 μm (respectively 1.3 μm).

For wavelengths close to 1.5 μm, such erbium-doped fibres make it possible to produce an optical amplifier whose gain, as a function of the wavelength, is virtually constant in a natural manner, which is not the case for an erbium-doped silica fibre amplifier.

This property is of interest for transmitting a plurality of wavelengths and several methods have been proposed for "flattening" the gain spectrum of the amplifiers produced with the aid of doped silica fibres.

Thus, the use of erbium-doped fluoride glass fibres is the simplest solution for producing optical amplifiers with a flat spectral gain.

Moreover, recent results have shown that pumping efficiencies equivalent to the pumping efficiencies of silica doped by $Er^{3+}$ ions could be obtained with such erbium-doped fluoride glass fibres.

For wavelengths close to 1.3 μm, the only fibre optical amplifier which could appropriately operate at present is a praseodymium-doped fluoride glass fibre amplifier.

In telecommunications systems, these fluoride glass fibre-based amplifiers must be inserted between two ends of silica optical fibres and it is important that the input and output of said amplifiers are wired in standard silica optical fibres (CCITT recommendation G652). This gives rise to the problem of joining silica fibres and fluoride glass fibres.

It is not possible to fusion weld a doped or undoped, fluoride glass fibre with a silica fibre, as a result of the fact that the fusion temperatures differ widely. Therefore it is not possible to use methods for the production of silica-based optical amplifiers for producing a doped fluoride glass fibre optical amplifier.

For solving this problem, one known solution consists of joining a fluoride glass fibre and a standard silica fibre by means of a connector, e.g. of the OPTABALL (registered trademark) system marketed by Radial, whereof it is possible to adjust the dynamics losses.

It is therefore possible to produce an optical amplifier incorporating a doped fluoride glass optical fibre connected on one side to a silica fibre by means of such a connector (input connector) and on the other side to another silica fibre by a connector of the same type (output connector).

However, the reduction of the size of the optical mode in the doped fluoride glass fibre, necessary for having an optimum high pumping efficiency, leads to unacceptable losses on injecting the pumping radiation and the signal to be amplified, across the input connector, and at the extraction of the amplified signal, across the output connector of the doped fluoride glass fibre.

The adaption of the optical mode diameter between the standard silica fibre and the doped fluoride glass fibre can be improved by using an intermediate silica fibre having the same mode diameter as the doped fluoride glass fibre, said intermediate fibre being fusion welded to the standard fibre on one side and bonded to the doped fluoride glass fibre on the other side.

The fusion welding of the two silica fibres gives losses typically below 0.3 dB, whilst the bonding of the silica fibre to the doped fluoride glass fibre takes place with losses which are typically below 0.4 dB.

As a result of the optical losses induced by said bonding (due to the difference in the nature of the two glasses forming the fibres), the pumping efficiency of a doped fluoride glass fibre amplifier will still be below that of a comparable doped silica fibre amplifier. Moreover, the reliability of the bonding, which is traversed by a high optical power is not guaranteed.

The present invention obviates these disadvantages by proposing an optical amplifier having a doped fluoride glass optical fibre and a process for the production of said amplifier making it possible to both minimize the coupling losses of the doped fluoride glass fibre, prevent problems due to bonding, as indicated hereinbefore and have an optical amplifier input and output constituted by standard silica optical fibres.

SUMMARY OF THE INVENTION

The present invention relates to an optical amplifier incorporating a fluoride glass optical fibre doped in such a way as to be able to amplify a light signal when a pumping radiation is injected into the fibre, said amplifier being characterized in that it also comprises:

a 2 to 1-type optical multiplexer having on the one hand two silica optical fibres and on the other a single fluoride glass optical fibre, whereof at least one section is doped in such a way as to constitute said doped fluoride glass fibre, said multiplexer adapting the mode diameter of the silica fibres to the mode diameter of its fluoride glass fibre, at least one other silica optical fibre and an optical coupling means between the latter and the fluoride glass fibre, said coupling means serving to adapt the mode diameter of said other silica fibre to the mode diameter of the fluoride glass fibre, the light signal passing from a silica fibre located on one side of the amplifier to a silica fibre located on the other side thereof, whilst the pumping radiation is injected by at least one silica fibre of the amplifier, which is not said latter silica fibres.

The term "fluoride glass optical fibre doped so as to be able to amplify a light signal" means an optical fibre, whose core is made from a fluoride glass appropriately doped in order to constitute an amplifier medium with respect to the signal. For this purpose, the fluoride glass core is e.g. doped by erbium or praseodymium ions.

According to a preferred embodiment of the amplifier according to the invention, the optical coupling means is another 2 to 1 optical multiplexer having on the one hand two silica optical fibres and on the other the fluoride glass fibre.

Thus, an optical amplifier having a symmetrical structure is obtained with inputs and outputs on silica fibres. The core of said optical fibre section can be doped by ions of at least one rare earth.

According to a special embodiment of the amplifier according to the invention, the fluoride glass optical fibre is doped over its entire length.

According to another embodiment of the amplifier according to the invention, the fluoride glass optical fibre incorporates a fluoride glass optical fibre section doped so as to be able to amplify the light signal and, on both sides of said section, two other undoped fluoride glass optical fibre sections.

The present invention also relates to a process for the production of an optical amplifier incorporating a fluoride glass optical fibre doped so as to be able to amplify a light signal when a pumping radiation is injected into the fibre, said process being characterized in that it comprises the following stages:

a 2 to 1 optical multiplexer is produced having on the one hand two silica optical fibres and on the other a fluoride glass optical fibre, whereof at least one section is doped so as to constitute said doped fluoride glass fibre, said multiplexer serving to adapt the mode diameter of the silica fibres to the mode diameter of its fluoride glass fibre and an optical coupling is brought about between the fluoride glass fibre and at least one other silica optical fibre, said coupling being carried out in such a way as to adapt the mode diameter of said other silica fibre to the mode diameter of the fluoride glass fibre.

According to a preferred embodiment of the process according to the invention, a standard silica optical fibre is welded to each of said silica optical fibres and another standard silica optical fibre is welded to said other silica optical fibre, the mode diameter of the fluoride glass optical fibre being equal to the mode diameter of said silica optical fibres and said other silica optical fibre and smaller than the mode diameter of the standard silica fibres.

Preferably, the ends of the fluoride glass fibre are polished perpendicularly or obliquely to its axis.

BRIEF DESCRIPTION OF THE DRAWINGS

The present invention is described in greater detail hereinafter relative to non-limitative embodiments and with reference to the attached drawings wherein show.

DETAILED DESCRIPTION OF THE PREFERRED EMBODIMENTS

Figure 1:
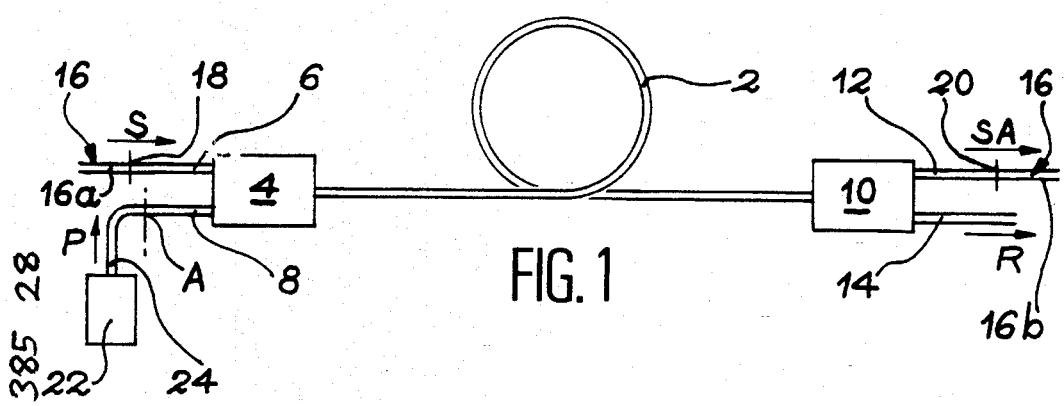
FIG. 1 A diagrammatic view of a particular embodiment of the optical amplifier according to the invention having two optical multiplexers connected by a fluoride glass optical fibre doped by ions of a rare earth.

The amplifier according to the invention and which is diagrammatically shown in FIG. 1 comprises a fluoride glass optical fibre 2, whose core is doped by ions of a rare earth, a first "2 to 1"-type optical multiplexer 4, incorporating two input optical fibres 6 and 8 constituted by silica optical fibres, and an output optical fibre constituted by the optical fibre 2 (one end thereof being fitted in the multiplexer 4) and a second "2 to 1"-type optical multiplexer 10 having an input optical fibre also constituted by the optical fibre 2 (whose other end is thus fitted in the multiplexer 10) and two output optical fibres 12 and 14 constituted by silica optical fibres.

In the embodiment shown in FIG. 1, the optical amplifier according to the invention is inserted in an optical line constituted by a standard silica optical fibre 6 in which an optical signal S is propagated. The optical fibre 16 is interrupted for the insertion of said optical amplifier.

Part 16a of the fibre 16 is optically coupled to the optical fibre 6 of said amplifier by a fusion weld 18 and the other part 16b of said optical fibre 16 is optically coupled to the optical fibre 12 of the amplifier by a fusion weld 20.

The optical amplifier of FIG. 1 is also provided with a pumping laser 22 having a standard silica output optical fibre 24 and the latter is fusion welded to the optical fibre 8 at point A.

The fibres 2, 6, 8, 12 and 14 are monomodal and have the same mode diameter and the latter is smaller than the mode diameter of the monomodal fibres 16 and 24. The welds 18 and 20 and the welds at A and B are produced in such a way as to lead to losses below 0.3 dB.

The optical signal SA resulting from the amplification of the signal S by the amplifier of FIG. 1 passes out of the latter by the fibre 12 and is propagated in the fibre 16.

In the embodiment of FIG. 1, the optical pumping is co-directional (the pumping radiation P supplied by the laser 22 being propagated in the same direction as the signal S). The residual pumping radiation R is transmitted by the optical fibre 14.

In order to obtain the optical amplifier of FIG. 1, it is appropriate to produce two optical multiplexers 4 and 10. This can be achieved by the expert and there are already manufacturers e.g. J.D.S., of optical multiplexers of the "2 to 1" type having silica lenses and with two standard silica input fibres and a standard silica output fibre and it is merely necessary to modify the manufacture of such multiplexers by fitting a doped fluoride glass output fibre and silica input fibres of the same mode diameter as said output fibre.

The end of the output fibre placed in said multiplexer is polished perpendicularly or obliquely to its axis.

Thus, the first stage is to manufacture the multiplexer 4 provided with the fibres 6, 8, as well as the fibre 2. Thus, the "silica—fluoride glass" transition takes place via the lenses of the multiplexer 4.

Figure 2:
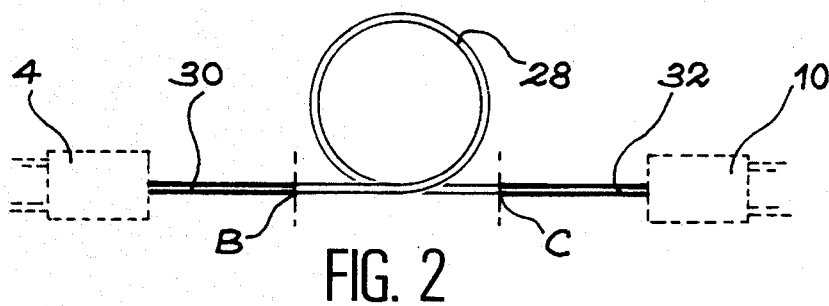
FIG. 2 A diagrammatic view of another embodiment in which the two multiplexers are connected by a fluoride glass optical fibre having a fluoride glass central section doped by said ions and on either side thereof undoped fluoride glass optical fibre sections welded by fusion to the central section.

In a variant diagrammatically illustrated in FIG. 2, the optical multiplexer 4 is produced with an output monomode fibre 30 made from undoped fluoride glass.

In the same way, the optical multiplexer 10 is produced with a monomode input optical fibre 32 of undoped fluoride glass and welding takes place by fusion of the free ends of the fibres 30 and 32 respectively to the ends of a fluoride glass, monomode optical fibre section 28 doped by a rare earth (the connection points respectively carry the references B and C in FIG. 2).

It is pointed out that in the case of FIG. 2, the fibres 6, 8, 12, 14, 30 and 32 have the same mode diameter as the standard silica fibres 16 and 24 and that the fibre 28 has a smaller mode diameter, which facilitates the fitting of the multiplexers 4 and 10.

Returning to the manufacture of the amplifier of FIG. 1, when the optical multiplexer 4 has been produced, the optimum length of the amplifying fibre (doped fluoride glass fibre) is determined. This determination takes place by examining the amplified spontaneous emission using an optical spectrum analyzer.

The multiplexer 10 (identical to the multiplexer 4) is then fitted to the free end of the optical fibre 2, which consequently enters the multiplexer 10. The end of the fibre 2 located in the multiplexer 10 is polished perpendicularly or obliquely to its optical axis.

As hereinbefore, the "fluoride glass—silica" transition takes place here by means of the not shown lenses of the multiplexer 10.

The optical amplifier according to the invention shown in FIG. 1 has a symmetrical structure.

Moreover, the amplifier of FIG. 1 advantageously permits the filtering of the residual pumping radiation R at the output of said amplifier by means of the not shown optical filter of the multiplexer 10.

It is therefore possible to monitor the operation of the pumping laser 22 by fitting appropriate, not shown monitoring means at the output of the optical fibre 14.

Figure 3:
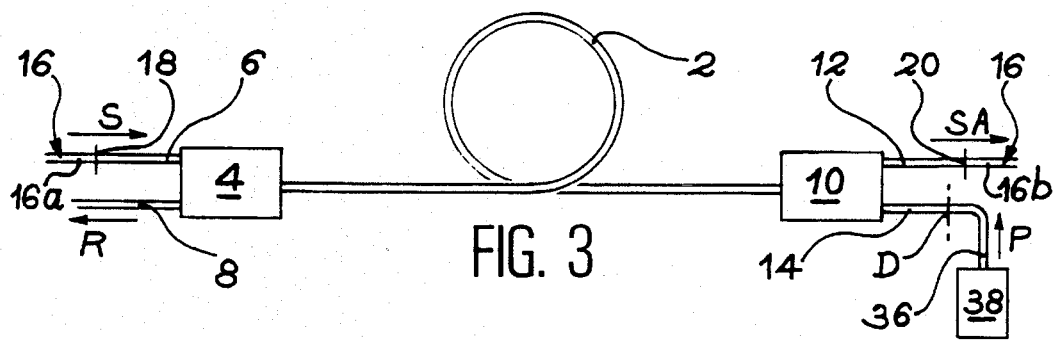
FIG. 3 Diagrammatically the possibility of producing a contra-directional pumping with an amplifier of the type shown in FIG. 1.

The structure of the amplifier shown in FIG. 1 also makes it possible to use a contra-directional pumping, as is diagrammatically shown in FIG. 3. In the latter, it is possible to see an optical amplifier identical to that shown in FIG. 1, except that the free end of the fibre 14 is fusion welded, at point D, to the monomode output optical fibre 36 of a pumping laser 38, said fibre 36 being a standard silica fibre. Moreover, in the case of FIG. 3, the free end of the fibre 8 is no longer connected to a pumping laser.

Thus, a contra-directional pumping is obtained and the residual pumping radiation R propagates in the optical fibre 8.

Figure 4:
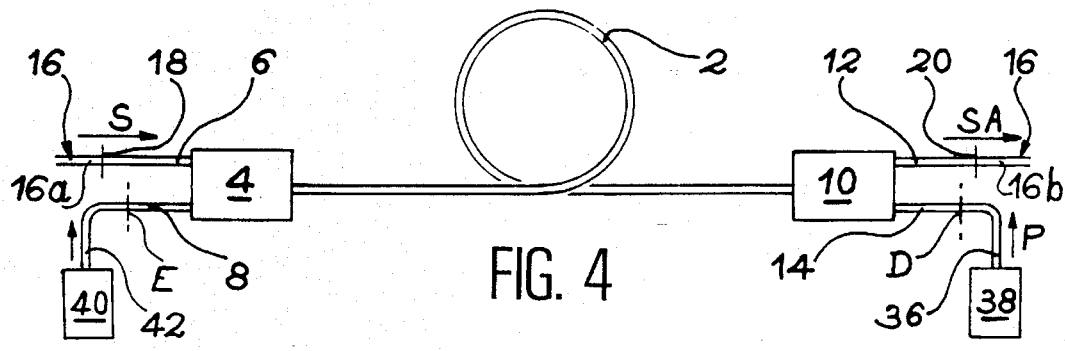
FIG. 4 Diagrammatically the possibility of producing contra-directional pumping and co-directional pumping with an amplifier of the type shown in FIG. 1.

In the variant of FIG. 4, the fibres 8 and 14 are respectively coupled to pumping lasers 40 and 38 in order to bring about both a co-directional pumping and a contra-directional pumping.

The laser 40 has a standard silica output monomode fibre 42, which is welded to the fibre 8 by fusion at point E.

In a variant of the amplifier shown in FIG. 1, the multiplexer 10 is produced without an optical filter or an optical fibre 14, which amounts to merely producing a fluoride glass—silica transition.

We claim:

1. Optical amplifier incorporating a fluoride glass optical fibre doped in such a way as to be able to amplify a light signal (S) when a pumping radiation (P) is injected into the doped fluoride glass fibre, said amplifier comprising:

a 2 to 1-type optical multiplexer (4) having a side with first and second silica optical fibres (6, 8) and another side with a single fluoride glass optical fibre (2, 30-28-32) having a section that is doped in such a way as to constitute said doped fluoride glass fibre, said multiplexer adapting the mode diameter of the first and second silica fibres to the mode diameter of the fluoride glass fibre, a third silica optical fibre (12, 14) and an optical coupling means (10) between the third silica fibre and the fluoride glass fibre, said coupling means serving to adapt the mode diameter of said third silica fibre to the mode diameter of the fluoride glass fibre, the light signal (S) passing from one of said first and third silica fibres located on an input side of the amplifier to the other of said first and third silica fibres located on an output side of said amplifier, whilst the pumping radiation (P) passes through the second silica fibre of the amplifier.

2. Amplifier according to claim 1, wherein the optical coupling means is another 2 to 1-type optical multiplexer (10) having a side with the third silica fibre and a fourth silica optical fibre and another side with the fluoride glass fibre (2, 30-28-32).

3. Amplifier according to claim 1, wherein the core of said doped section is doped by ions of at least one rare earth.

4. Amplifier according to claim 1, wherein the fluoride glass optical fibre (2) is doped over its entire length.

5. Amplifier according to claim 1, wherein the fluoride glass fibre further comprises two undoped, fluoride glass optical fibre sections (30, 32), said doped section being interposed between said two undoped sections.

6. Process for the production of an optical amplifier incorporating a fluoride glass optical fibre doped so as to be able to amplify a light signal (S) when a pumping radiation (P) is injected into the fluoride glass fibre, said process comprising the steps of:

providing a 2 to 1-type optical multiplexer (4) having a side with first and second silica optical fibres (6, 8) and another side with a fluoride glass optical fibre (2, 30-28-32) having a section that is doped so as to constitute said doped fluoride glass fibre, said multiplexer serving to adapt the mode diameter of the first and second silica fibres to the mode diameter of the fluoride glass fibre and optically coupling the fluoride glass fibre (2, 30-28-32) and a third silica optical fibre (12, 14), said coupling being carried out in such a way as to adapt the mode diameter of said third silica fibre to the mode diameter of the fluoride glass fibre.

7. Process according to claim 6, further comprising the step of welding standard silica optical fibres to said first, second and third silica optical fibres, the mode diameter of the fluoride glass optical fibre being equal to the mode diameter of said first second and third silica optical fibres and smaller than the mode diameter of the standard silica fibres.

8. Process according to claim 6, further comprising the step of polishing the ends of the fluoride glass fibre perpendicularly to its axis.

9. Process according to claim 6 further comprising the step of polishing the ends of the fluoride glass fibre obliquely to its axis.

* * * * *